United States Patent Office 2,754,324
Patented July 10, 1956

2,754,324

α-α-DICHLOROPROPIONATES OF THE HALO-ARYLOXY LOWERALKANOLS

Harry F. Brust and Herman O. Senkbeil, Midland, Mich., assignors to The Dow Chemical Company, Midland, Mich., a corporation of Delaware No Drawing. Application April 6, 1953,
Serial No. 347,184

7 Claims. (Cl. 260—487)

The present invention relates to the α,α-dichloropropionates of the haloaryloxy loweralkanols. These compounds are crystalline solids or oily liquids somewhat soluble in many organic solvents and substantially insoluble in water. They have been found to be active as plant growth control materials and are adapted to be employed in dust and spray compositions for the control of the growth and the killing of weeds and for the sterilization of soil with regard to the growth of plants.

The new compounds may be prepared by reacting (1) α,α-dichloropropionic acid and (2) a haloaryloxy loweralkanol. The reaction may be carried out in the presence of an esterification catalyst such as sulfuric acid and conveniently in a water-immiscible solvent such as toluene, monochlorobenzene or ethylene dichloride. The amount of the reactants to be employed is not critical, some of the desired product being produced with any proportion of ingredients. Good results are obtained when substantially equimolecular proportions of the reactants are employed. The employment of an excess of the ether-alcohol coupled with the removal of the water of reaction as formed, generally results in optimum yields.

In carrying out the reaction, the α,α-dichloropropionic acid, haloaryloxy alkanol and catalyst, if employed, are mixed together and the resulting mixture heated at a temperature of from about 75° to 180° C. for a period of time to complete the reaction. Alternatively the α,α-dichloro-ployed, may be dispersed in the solvent and the resulting mixture heated at the boiling temperature. During the heating, a mixture of solvent and water of reaction may be continuously distilled out of the reaction vessel, condensed and the solvent recovered. Additional solvent is introduced into the reaction zone as may be necessary.

Upon completion of the reaction, the desired product may be separated by fractional distillation under reduced pressure. When the desired product precipitates as a crystalline solid in the cooled reaction mixture or in the reaction residue to be obtained following removal of the reaction solvent, this solid product may be separated in an alternative method by filtration and thereafter purified by recrystallization from various organic solvents. In another method of separation and purification, the solvent mixture of the reaction product is neutralized with an alkali such as dilute aqueous sodium carbonate. The resulting mixture divides into aqueous and solvent layers. The solvent layer, which contains the ester reaction product is separated and washed several times with water to extract the water-soluble salts of catalyst and any unreacted α,α-dichloropropionic acid. The washed mixture is then fractionally distilled under reduced pressure to obtain the desired ester compound.

The following examples illustrate the invention but are not to be construed as limiting the same:

*Example 1*

162 grams (0.782 mole) of 2-(2,4-dichlorophenoxy)-ethanol, 112 grams (0.782 mole) of α,α-dichloropropionic acid and 0.5 milliliter of concentrated sulfuric acid were dispersed in 150 milliliters of ethylene dichloride and the resulting mixture heated for about 12 hours at a temperature of from 100° to 111° C. The heating was carried out with continuous distillation of ethylene dichloride together with the water of reaction as formed, separation of the water and recycling of the ethylene dichloride. Following the heating period, the reaction mixture was washed with water and thereafter fractionally distilled under reduced pressure to obtain a 2-(2,4-dichlorophenoxy)-ethyl α,α-dichloropropionate product as a viscous liquid having a boiling point of 150°–152° C. at 1 millimeter pressure and a freezing point of 34° C.

*Example 2*

198 grams (0.897 mole) of 1-(2,4-dichlorophenoxy)-2-propanol, 128 grams (0.897 mole) of α,α-dichloropropionic acid and 0.5 milliliter of concentrated sulfuric acid were dispersed in 150 milliliters of ethylene dichloride and the resulting mixture heated for about 15 hours at a temperature of from 108° to 113° C. The heating was carried out with continuous distillation of ethylene dichloride together with the water of reaction as formed, separation of the water and recycling of the ethylene dichloride. Upon completion of the reaction, the mixture was washed with water and thereafter fractionally distilled under reduced pressure to obtain a 1-(2,4-dichlorophenoxy)-2-propyl α,α-dichloropropionate product as a viscous liquid having a boiling point of 137°–139° C. at 0.5 millimeter pressure and a freezing point of 49° C.

*Example 3*

383 grams (1.59 moles) of 2-(2,4,5-trichlorophenoxy)-ethanol, 239 grams (1.67 moles) of α,α-dichloropropionic acid and 0.5 milliliter of concentrated sulfuric acid were dispersed in 600 milliliters of ethylene dichloride and the resulting mixture heated for about 21 hours at a temperature of from 91.5° to 95.5° C. The heating was carried out in the usual fashion with continuous distillation of ethylene dichloride together with the water of reaction as formed, separation of the water and recycling of the ethylene dichloride. Following the reaction, the mixture was washed with water and thereafter fractionally distilled under reduced pressure to separate a 2-(2,4,5-trichlorophenoxy)-ethyl α,α-dichloropropionate product as a crystalline solid melting at 49°–50° C. and boiling at 161°–164° C. at 0.5 millimeters pressure.

*Example 4*

One mole quantities of 2-(4-chloro-o-toloxy)-ethanol and α,α-dichloropropionic acid were dispersed in 400 milliliters of ethylene dichloride and the resulting mixture heated at a temperature of from 94° to 104° C. for about 22 hours. The heating was carried out with continuous distillation of water of reaction and the entraining agent as previously described. Following the reaction, the mixture was fractionally distilled under reduced pressure to obtain a 2-(4-chloro-o-toloxy)-ethyl α,α-dichloropropionate as a viscous liquid boiling at 167°–172° C. at 3.5 millimeters pressure and freezing at 36° to 39° C.

*Example 5*

215 grams (0.81 mole) of 2-(2,4,5-trichlorophenoxy)-1-propanol and 139 grams (0.97 mole) of α,α-dichloropropionic acid were dispersed in 200 milliliters of ethylene dichloride and the resulting mixture heated at a temperature of from 116° to 121° C. for about 41 hours. The heating was carried out in the usual manner with continuous distillation of water of reaction and entraining agent. Upon completion of the reaction, the mixture was fractionally distilled under reduced pressure to obtain a 2-(2,4,5-trichlorophenoxy)-1-propyl α,α-dichloropropionate product as a crystalline solid at 57°–57.5° C. and boiling at 161°–162° C. at 0.65 millimeter pressure.

Example 6

One mole quantities of 3-(4-chlorophenoxy)-1-propanol and α,α-dichloropropionic acid are reacted together in 200 millimeters of ethylene dichloride as described in Example 5 to obtain a 3-(4-chlorophenoxy)-1-propyl α,α-dichloropropionate product.

Example 7

255.5 grams (1 mole) of 1-(2,4,5-trichlorophenoxy)-2-propanol, 143 grams (1 mole) of α,α-dichloropropionic acid and 0.5 milliliter of concentrated sulfuric acid were dispersed in 300 milliliters of ethylene dichloride and the resulting mixture heated as previously described at a temperature of from 90° to 105° C. for about 12 hours. Following the heating period, the mixture was washed with water and thereafter fractionally distilled under reduced pressure to obtain a 1-(2,4,5-trichlorophenoxy)-2-propyl α,α-dichloropropionate product as a viscous liquid boiling at 154°–157° C. at 0.08 millimeter pressure.

Example 8

164 grams (0.755 mole) of 2-(4-bromophenoxy)-ethanol and 108 grams (0.755 mole) of α,α-dichloropropionic acid were dispersed in 200 milliliters of ethylene dichloride and the resulting mixture heated at a temperature of from 105° to 109° C. for about 40 hours. The heating was carried out with continuous distillation of water of reaction and entraining agent as previously described. Following the heating period, the mixture was washed with water and thereafter fractionally distilled under reduced pressure to obtain a 2-(4-bromophenoxy)-ethyl α,α-dichloropropionate product as a viscous liquid having a refractive index $n/D$ of 1.5428 at 25° C.

Example 9

In a similar manner, 1.84 mole quantities of 1-(4-bromophenoxy)-2-propanol and α,α-dichloropropionic acid were dispersed in 300 milliliters of ethylene dichloride and the resulting mixture heated in the usual fashion for about 42 hours at a temperature of from 114° to 127° C. Following the heating period, the mixture was washed with water and thereafter fractionally distilled under reduced pressure to separate a 1-(4-bromophenoxy)-2-propyl α,α-dichloropropionate product as a viscous liquid having a refractive index $n/D$ of 1.5308 at 25° C.

Example 10

A mixture containing 0.103 mole quantities of 1-(pentachlorophenoxy)-2-propanol and α,α-dichloropropionic acid in 150 milliliters of ethylene dichloride was heated in the usual manner at a temperature of from 85° to 109° C. for about 48 hours. Following the heating period, the mixture was washed with water and thereafter fractionally distilled under reduced pressure to separate a 1-(pentachlorophenoxy)-2-propyl α,α-dichloropropionate product as a crystalline solid boiling at 162° to 164° C. at 0.15 millimeter pressure.

In a similar manner, other haloaryloxyalkyl α,α-dichloropropionates may be prepared as follows:

2-(4-chlorophenoxy)-ethyl α,α-dichloropropionate by reacting together α,α-dichloropropionic acid and 2-(4-chlorophenoxy)-ethanol.

2-(2-bromo-4-chlorophenoxy)-ethyl α,α-dichloropropionate by reacting together α,α-dichloropropionic acid and 2-(2-bromo-4-chlorophenoxy)-ethanol.

2-(pentachlorophenoxy)-ethyl α,α-dichloropropionate by reacting together α,α-dichloropropionic acid and 2-(pentachlorophenoxy)-ethanol.

2-(2,4-dibromophenoxy)-ethyl α,α-dichloropropionate by reacting together α,α-dichloropropionic acid and 2-(2,4-dibromophenoxy)-ethanol.

3-(2,4-dichlorophenoxy)-1-butyl α,α-dichloropropionate by reacting together α,α-dichloropropionic acid and 3-(2,4-dichlorophenoxy)-1-butanol.

The new α,α-dichloropropionic acid esters have been tested and found effective as herbicides, i. e. for the killing of weeds. For such use the products may be dispersed on an inert finely divided solid and employed as dusts. Also, such mixtures may be dispersed in water with the aid of a wetting agent, and the resulting aqueous suspensions employed as sprays. In other procedures, the products may be employed as constituents of oil-in-water emulsions, or water dispersions with or without the addition of wetting, dispersing or emulsifying agents.

The haloaryloxyalkanols employed for starting materials as previously described are conveniently prepared by reacting an alkali metal salt of an appropriate phenol with a monohaloaliphatic alcohol such as ethylene chlorohydrin, propylene chlorohydrin, 2-chloro-1-propanol, 3-bromo-1-propanol, 3-chloro-1-propanol, 3-chloro-2-butanol, 3-chloro-1-butanol and 3-chloro-2-pentanol. Representative members of the haloaryloxyalkanols are oils or crystalline solids characterized by the physical properties set forth in the following table:

| Compound | Boiling Point | Melting Point |
| --- | --- | --- |
| 2-(2-chlorophenoxy)-ethanol | 137° C. at 9 mm. pressure. | |
| 2-(4-chlorophenoxy)-ethanol | 130°–135° C. at 5 mm. pressure. | 51°–53° C. |
| 2-(4-chloro-o-toloxy)-ethanol | | |
| 2-(2,4-dichlorophenoxy)-ethanol | 174° C. at 0.3 mm. pressure. | 54°–57.5° C. |
| 2-(2,4,5-trichlorophenoxy)-ethanol | 121°–131° C. at 0.3 mm. pressure. | 66.5°–68.5° C. |
| 1-(4-chlorophenoxy)-2-propanol | 145.5°–148.5° C. at 10 mm. pressure. | |
| 1-(2-chlorophenoxy)-2-propanol | 141°–149° C. at 10 mm. pressure. | |
| 1-(2,4-dichlorophenoxy)-2-propanol | 151°–159° C. at 10 mm. pressure. | |
| 1-(4-chloro-o-toloxy)-2-propanol | 135° C. at 0.3 mm. pressure. | |
| 1-(2,4,5-trichlorophenoxy)-2-propanol | 150°–155° C. at 2 mm. pressure. | 47.8°–48.0° C. |
| 2-(2,4,5-trichlorophenoxy)-1-propanol | 130°–131° C. at 1 mm. pressure. | |
| 1-(pentachlorophenoxy)-2-propanol | | 64°–66° C. |
| 2-(4-bromophenoxy)-ethanol | 132°–134° C. at 4.6 mm. pressure. | 51°–55° C. |
| 2-(2,4-dibromophenoxy)-ethanol | 159°–161° C. at 3 mm. pressure. | 59°–60° C. |
| 2-(2-bromo-4-chlorophenoxy)-ethanol | 151°–152° C. at 4.6 mm. pressure. | 39.5°–41.5° C. |
| 1-(4-bromophenoxy)-2-propanol | 129°–136° C. at 4 mm. pressure. | |
| 1-(2-bromo-4-chlorophenoxy)-2-propanol | 149°–150° C. at 4.8 mm. pressure. | |

We claim:

1. An α,α-dichloropropionate of a benzene series haloaryloxyloweralkanol.

2. An α,α-dichloropropionate of a benzene series haloaryloxyethanol.

3. 2 - (2,4 - dichlorophenoxy) - ethyl α,α -dichloropropionate.

4. 1-(2,4-dichlorophenoxy)-2-propyl α,α-dichloropropionate.

5. 2 - (2,4,5 - trichlorophenoxy) - ethyl α,α - dichloropropionate.

6. 2-(4-chloro-o-toloxy)-ethyl α,α-dichloropropionate.

7. 1 - (2,4,5 - trichlorophenoxy) - 2 - propyl α,α - dichloropropionate.

References Cited in the file of this patent

UNITED STATES PATENTS 2,401,261    McMullen _____ May 28, 1946

OTHER REFERENCES

Beilstein, 4th ed. (1920), Band II, 250.
Thompson, Chem. Abstracts 41, 3902–3913 (1947).